July 31, 1928.
O. H. LUDEMAN
1,679,044
CONTROLLING MECHANISM
Filed Jan. 26, 1925
2 Sheets-Sheet 1
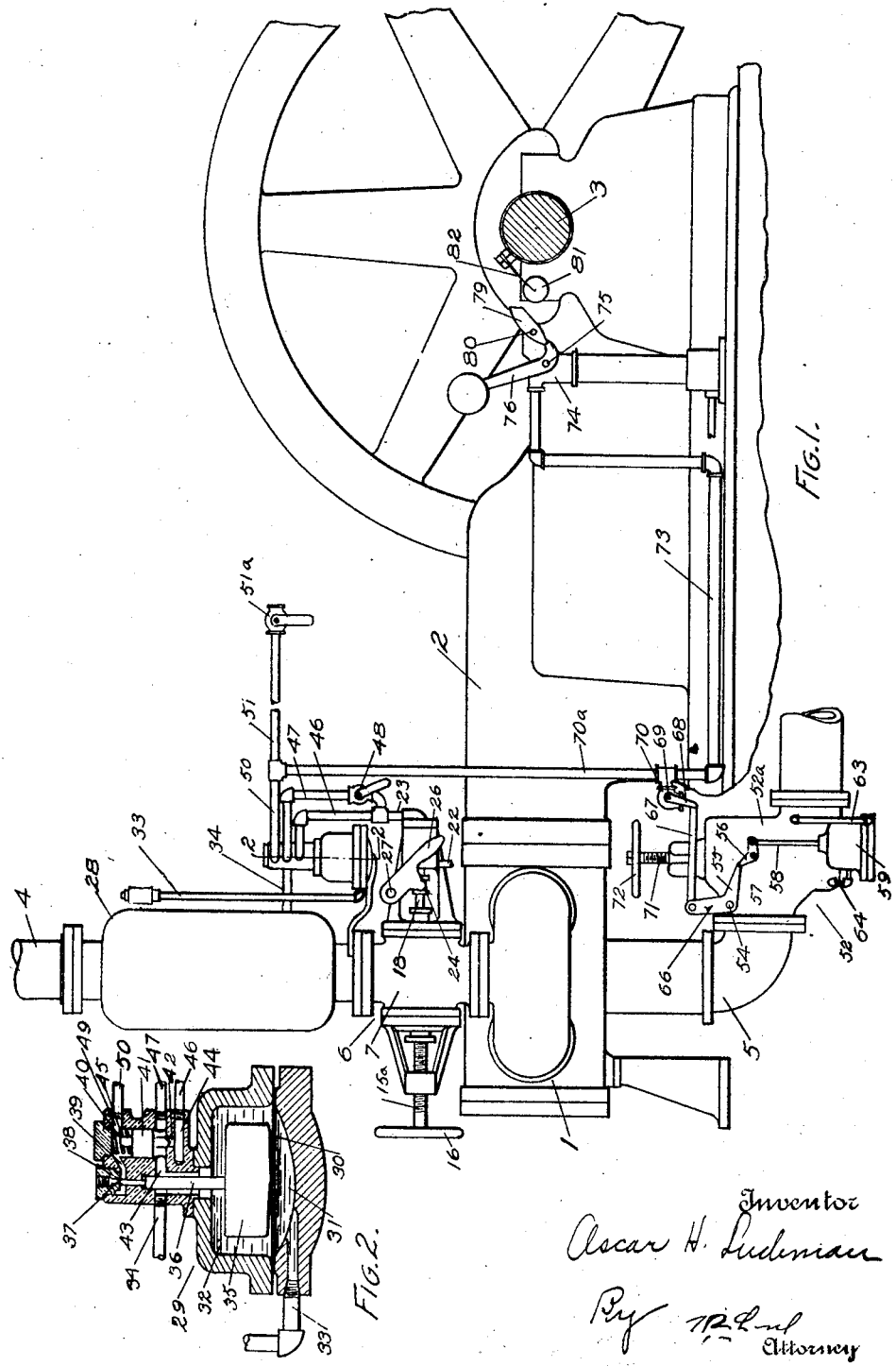

July 31, 1928.

O. H. LUDEMAN 1,679,044

CONTROLLING MECHANISM

Filed Jan. 26, 1925

Inventor
Oscar H. Ludeman
By W. L.
Attorney

Patented July 31, 1928.

1,679,044

UNITED STATES PATENT OFFICE.

OSCAR H. LUDEMAN, OF GLEN RIDGE, NEW JERSEY, ASSIGNOR TO LUDEMAN BROTHERS, INCORPORATED, OF NEW YORK, N. Y., A CORPORATION OF NEW YORK.

CONTROLLING MECHANISM.

Application filed January 26, 1925. Serial No. 4,881.

Steam engines of different types are sometimes very seriously injured through the introduction of water to the engine. This water may be introduced to the engine either from the inlet, or in some instances from the exhaust. Engines are also sometimes injured where the controlling devices do not operate and are subjected to an over or dangerous speed. The present invention is designed to safeguard the engine against the introduction of water from the inlet, or from the exhaust, or from a dangerous speed. Other features and details of the invention will appear from the specification and claims.

The invention is illustrated in the accompanying drawings as follows:—

Fig. 1 shows a side elevation of an engine with the several safety devices arranged thereon.

Fig. 2 a central section of the liquid level sensitive device responding to accumulations of liquid at the inlet, on the line 2—2 in Fig. 1.

Fig. 3 a central section of a quick-closing safety valve arranged to respond to the several control mechanisms.

Fig. 4 a central section of the valve mechanism preventing an introduction of water to the engine from the exhaust.

1 marks the engine cylinder, 2 the frame, 3 the crank shaft, 4 the inlet or supply pipe leading to the engine, and 5 the exhaust pipe.

A quick-acting valve 6 is arranged in the inlet pipe and comprises a body 7 having a diaphragm 8. Seats 9 and 10 are arranged in the diaphragm at opposite sides of a valve passage 11. A valve 12 operates on the seat 10. This is provided with a stem 13 extending through a stuffing box 14. The stem is screw-threaded at 15$^a$ and operates in a nut 15. It is provided with a handle 16 this performing the functions of the ordinary throttle valve for the engine. A valve disc 17 operates on the seat 9. It is provided with a stem 18. The stem extends through a stuffing box 19. A piston 20 is arranged at the outer end of the stem and operates in a cylinder 21, a stuffing box 21$^a$ being provided at the forward end of the cylinder. A passage 23 leads to the rear end of the cylinder and a drip passage 22 is connected to the front end of the cylinder.

When it is desirable to trip the valve, pressure is turned into the cylinder through the passage 23 forcing the piston forward and with it the valve 17, thus closing the valve. In order to re-set the valve 17, the valve 12 is closed. A small opening 17$^a$ is provided which permits a balancing of pressures between the valves 12 and 17. A spool 24 is arranged on the stem 18. A pin 25 engages the spool and is carried by a lever 26. The lever 26 is pivoted on a pin 27. The valve 17 can be readily withdrawn by the lever after pressure is relieved on the outer end of the cylinder.

A separator 28 is arranged in the pipe 4 leading to the valve 6. A liquid level sensitive device 29 is connected with the separator. This has a diaphragm 30 with chambers 31 and 32 at opposite sides of the diaphragm. The chamber 31 is connected through a pipe 33 with the upper end of the separator and the chamber 32 is connected through a pipe 34 with the lower end of the separator. The pipe 33 if not initially filled soon fills with water and thus affords a constant hydrostatic head on the bottom of the diaphragm. The upper part of the diaphragm is subjected to varying pressure incident to variations in level of liquid in the separator. A weight 35 is arranged on the diaphragm to balance the head in the pipe 33, or as nearly balance it as is desirable with relation to the level in the separator at which it is desired the head on the upper part of the diaphragm shall operate the device. A stem 36 extends upwardly from the weight and is connected with a needle valve 37. The needle valve operates on a seat 38 and controls the opening to the atmosphere from a passage 39. The passage 39 opens to a cylinder 40. A plunger 41 is arranged in the cylinder 40 and controls a passage 42 connecting a passage 43 leading from the chamber 32 with a passage 44. A spring 45 operates on the plunger and normally holds the valve 42 in closed position. A pipe 46 leads from the passage 44 to the inlet passage 23 of the safety valve so that when the valve 42 is raised connecting the passage 44 with the steam supply pressure through the pipe 34 pressure is immediately delivered to the cylinder 21 thus closing the safety valve. The operation of this part of the device, therefore, is readily apparent. Normally there is enough leakage past the stem of the needle valve to put the upper part of the cylinder 40 under pressure so that the pressure on the plunger, or piston 41 is balanced and the valve 42 is retained in its closed position through the action of the spring. When, however, the water accumulates in the separator sufficient to actuate the diaphragm the needle valve is opened permitting a direct escape from the cylinder to the atmosphere and this reduction in pressure on the upper part of the piston 41 with the maintenance of pressure below it immediately operates this piston opening the valve 42 so as to actuate the safety valve.

A passage 49 extends from the upper part of the cylinder 40 and a pipe 50 leads from this passage. The pipe 50 is extended by a pipe 51 to any desired point of remote control which is supplied with a manually operated valve 51ª controlling the opening of this pipe to the atmosphere. If the valve is opened pressure is immediately relieved on the upper part of the piston 41 and the valve 42 immediately opened, thus operating the safety valve. Where it is desired to trip the safety valve immediately at the mechanism this is accomplished by a by-pass 47 which extends from the passage 43 to a pipe 46. This is controlled by a manually actuated valve 48. By operating this valve pressure is directly admitted to the cylinder 21 so as to operate the safety valve.

A non-return exhaust valve 52 is arranged in the exhaust pipe 5. It has a body 52ª with a seat 53ª which is adapted to receive a swinging valve 53. It will be noted that the body steps down from the seat leaving a space below it for the accumulation of water prior to its reaching the level of the seat. The valve 53 is mounted on a shaft 54 which extends through the body. A rock arm 55 is mounted on the stem or shaft 54 and the valve 53 is normally held open by a trip lever 56 operating on the rock arm 55. The lever 56 is mounted on a pin 57 secured to the body 52 and a stem 58 extends from the lever 56 to a liquid level sensitive device 59. The liquid level sensitive device 59 has a diaphragm 60 which is arranged between chambers 61 and 62. The chamber 61 is connected by a pipe 63 with a point in the exhaust line above the level of the device and a pipe 64 with the chamber 62, the pipe 64 leading from a lower point in the pipe. A hydrostatic head is established in the pipe 63 because it fills immediately, if not initially filled, and this remains constant. This is balanced to the desired extent by a weight 65 on the diaphragm. As soon as liquid accumulates to the pre-determined level creating a corresponding preponderance of weight above the diaphragm the diaphragm is forced downwardly thus carrying with it the stem 58 moving the trip lever from under the rock arm 55 and permitting the valve 53 to swing shut.

It is desirable when the exhaust valve closes by reason of the back flow of water to shut down the engine and this is accomplished in the present mechanism as follows: A rock arm 66 is connected with the stem 54. A link 67 connects the arm 66 with an arm 68. The arm 68 is mounted on a controlling stem 69 of an exhaust valve 70, the exhaust valve 70 being arranged in a pipe 70ª extending from the pipe 50. When, therefore, the valve 53 drops the valve 70 is opened, reducing the pressure in the pipe 70ª and consequently from the cylinder 40 and this is followed by the upward movement of the piston 41 and the introduction of steam under pressure to the cylinder 21 of the safety valve thus closing the safety valve. It is often desirable to positively close the exhaust passage and for that reason a screw-threaded stem 71 extends through the body 52 against the swinging valve 53 thus locking it in closed position, the screw-threaded stem being provided with the usual wheel 72 for its operation.

The safety feature is made speed sensitive by the following mechanism: A pipe 73 leads from the pipe 70ª to a valve 74. The valve 74 has a controlling stem 75 on which is mounted the weight lever 76. This lever is normally held to close the valve by a trip lever 79. The trip lever is mounted on a pin 80 on a suitable mounting. A weight 81 is mounted on a spring 82 carried by the crank shaft 3. With an excess of speed the weight 81 moving outwardly through the influence of centrifugal force strikes the trip lever 79, releases the weighted lever 76 and opens the valve 74 to the atmosphere, thus venting the cylinder 40 and unbalancing the piston 41. This opens the valve 42 and connects the cylinder 21 with the supply pipe, thus immediately closing the safety valve.

What I claim as new is:—

1. In a controlling mechanism, the combination of a steam engine; a steam supply passage leading to the engine; an inlet closure valve in the passage; closing mechanism for said valve; water and speed sensitive devices controlling said mechanism; and water level sensitive means responsive to exhaust water accumulations controlling said water sensitive device.

2. In a controlling mechanism, the combination of a steam engine; a steam supply passage leading to the engine; an inlet closure valve in the passage; closing mechanism for said valve; water and speed sensitive devices controlling said mechanism; and water level sensitive means responsive to inlet water accumulations and exhaust water accumulations controlling said water sensitive device.

3. In a controlling mechanism, the combination of a steam engine; a steam supply passage leading to the engine; an inlet closure valve in the passage; closing mechanism for said valve; water and speed sensitive devices controlling said mechanism; and water level sensitive means responsive to exhaust water accumulations and speed sensitive means controlling said devices.

4. In a controlling mechanism, the combination of a steam engine; a steam supply passage leading to the engine; an inlet closure valve in the passage; closing mechanism for said valve; water and speed sensitive devices controlling said mechanism; and water level sensitive means responsive to inlet and exhaust water accumulations and speed sensitive means controlling said devices.

5. In a controlling mechanism, the combination of a steam engine; an exhaust passage leading from the engine; an exhaust valve in the exhaust passage; water level sensitive devices controlling the exhaust valve; an inlet closure valve; and apparatus actuating the closure valve as the exhaust valve is operated.

6. In a controlling mechanism, the combination of a steam engine; an inlet closure valve; an exhaust closure valve; a water level sensitive means responsive to inlet water accumulations operating the inlet closure valve; water level sensitive means responsive to exhaust water accumulations operating the exhaust closure valve; and apparatus operating the inlet closure means upon the closing of the exhaust closure valve.

7. In a controlling mechanism, the combination of a steam engine; an exhaust closure valve; an inlet closure valve; mechanism for closing the inlet closure valve; water level sensitive means actuating the exhaust closure valve; a speed sensitive means; and apparatus operating the mechanism through the action of either of said means.

8. In a controlling mechanism, the combination of a steam engine; an inlet closure valve; water level sensitive means; and devices controlled by said means actuating the closure valve, said devices being operable only upon the discharge of accumulated water from said means.

9. In a controlling mechanism, the combination of a steam engine; an inlet closure valve; water level sensitive means responsive to water accumulations at the inlet; and devices controlled by said means actuating the closure valve, said devices being operable only upon the discharge of accumulated water from said means.

10. In a controlling mechanism, the combination of a steam engine; an inlet closure valve; water level sensitive means responsive to water accumulations at the exhaust; and devices controlled by said means actuating the closure valve, said devices being operable only upon the discharge of accumulated water from said means.

11. In a controlling mechanism, the combination of a steam engine; an inlet closure valve; water level sensitive means responsive to inlet accumulations of water; water level sensitive means responsive to exhaust accumulations of water; and devices controlled by said means, said devices being operable only upon the discharge of accumulated water from both of said means.

12. In a controlling mechanism, the combination of a steam engine; an exhaust passage leading from the engine; an exhaust closure valve comprising a body having a step below its seat; a swinging valve operating on the seat; and a water level sensitive device controlling the closing of said valve.

13. In a controlling mechanism, the combination of a steam engine; an exhaust passage leading from the engine; a swinging valve controlling the exhaust passage; means for locking the valve in open position; and water level sensitive devices controlling the means for locking the valve in open position.

In testimony whereof I have hereunto set my hand.

OSCAR H. LUDEMAN.